(12) United States Patent
Das

(10) Patent No.: US 9,609,056 B2
(45) Date of Patent: Mar. 28, 2017

(54) METHODS FOR OBTAINING CONTENT FROM A PEER DEVICE

(71) Applicant: Google Technology Holdings LLC, Mountain View, CA (US)

(72) Inventor: Sujoy Das, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 103 days.

(21) Appl. No.: 14/306,350

(22) Filed: Jun. 17, 2014

(65) Prior Publication Data
US 2015/0281349 A1   Oct. 1, 2015

Related U.S. Application Data

(60) Provisional application No. 61/972,308, filed on Mar. 29, 2014.

(51) Int. Cl.
*G06F 15/16* (2006.01)
*H04L 29/08* (2006.01)

(52) U.S. Cl.
CPC ........ *H04L 67/1074* (2013.01); *H04L 67/104* (2013.01); *H04L 67/1059* (2013.01)

(58) Field of Classification Search
USPC ........................................................ 709/217
See application file for complete search history.

(56) References Cited

U.S. PATENT DOCUMENTS

| | | | |
|---|---|---|---|
| 7,509,372 B2 | 3/2009 | Dutta et al. | |
| 8,509,407 B2* | 8/2013 | Maenpaa | H04L 67/104 370/395.5 |
| 9,118,691 B2* | 8/2015 | Ramankrishnan | H04L 63/0407 |
| 2002/0188735 A1* | 12/2002 | Needham | G06F 17/30209 709/229 |
| 2002/0194256 A1* | 12/2002 | Needham | H04L 67/104 709/201 |

(Continued)

FOREIGN PATENT DOCUMENTS

EP    1229443 A2    8/2002

OTHER PUBLICATIONS

International Search Report; European Patent Office; International Application No. PCT/US2015/023019; dated Aug. 10, 2015.

(Continued)

*Primary Examiner* — Alicia Baturay
(74) *Attorney, Agent, or Firm* — Faegre Baker Daniels LLP

(57) ABSTRACT

A first peer device connects to a first mesh network, which does not have the second peer device. The first peer device transmits a request for the content to a third peer device over the first mesh network. In response to the request, the first peer device receives, from the third peer device, the identity of the second peer device and the identity of the file containing the content. The third peer device also creates a tracker representing the request. Subsequently, the third peer device connects to the second peer device over another mesh network (to which the first peer device may not be connected) and indicates to the second peer device that the first peer device has requested the file. The first peer device then connects to the second peer device over another mesh network and receives the file from the second peer device.

13 Claims, 7 Drawing Sheets

(56) References Cited

U.S. PATENT DOCUMENTS

| | | | | |
|---|---|---|---|---|
| 2004/0139228 A1* | 7/2004 | Takeda | | H04L 29/12066 709/245 |
| 2005/0152364 A1* | 7/2005 | Tagami | | H04L 29/06 370/389 |
| 2008/0126528 A1* | 5/2008 | Takeda | | H04L 29/12066 709/223 |
| 2009/0082885 A1* | 3/2009 | Nass | | H04L 12/12 700/90 |
| 2009/0216887 A1* | 8/2009 | Hertle | | H04L 29/125 709/227 |
| 2009/0240758 A1* | 9/2009 | Pasko | | H04L 67/104 709/201 |
| 2010/0121940 A1* | 5/2010 | Reeser | | G06F 17/30902 709/219 |
| 2010/0128731 A1 | 5/2010 | Alfano et al. | | |
| 2010/0185753 A1* | 7/2010 | Liu | | H04L 65/4084 709/219 |
| 2011/0225311 A1* | 9/2011 | Liu | | H04L 45/125 709/231 |
| 2011/0225312 A1* | 9/2011 | Liu | | H04L 12/18 709/231 |
| 2011/0238756 A1* | 9/2011 | Damola | | H04L 67/104 709/204 |
| 2011/0296053 A1* | 12/2011 | Medved | | H04L 67/104 709/241 |
| 2012/0113977 A1* | 5/2012 | Shimoosawa | | H04L 12/4641 370/352 |
| 2012/0173740 A1* | 7/2012 | Shukla | | H04L 67/141 709/228 |
| 2012/0331090 A1 | 12/2012 | Kimchi et al. | | |
| 2013/0227019 A1* | 8/2013 | Vyrros | | H04L 29/125 709/204 |
| 2013/0238683 A1* | 9/2013 | Wald | | H04L 67/06 709/202 |
| 2013/0304832 A1* | 11/2013 | He | | H04L 65/403 709/206 |
| 2013/0325949 A1* | 12/2013 | Virani | | G06F 9/541 709/204 |
| 2014/0016551 A1* | 1/2014 | Shin | | H04W 76/021 370/328 |
| 2014/0153440 A1* | 6/2014 | Zhou | | H04W 40/12 370/254 |
| 2014/0195643 A1* | 7/2014 | Liu | | H04L 67/06 709/217 |
| 2014/0310356 A1* | 10/2014 | Tseng | | H04L 61/2589 709/205 |
| 2015/0172991 A1* | 6/2015 | Petersen | | H04W 40/12 370/252 |

OTHER PUBLICATIONS

Vana Kalogeraki, A Local Search Mechanism for Peer-to-Peer Networks, Nov. 4, 2009, all pages.

Maria Papadopouli, Design and Implementation of a Peer-to-Peer Data Dissemination and Prefetching Tool for Mobile Users, Feb. 14, 2014, all pages.

* cited by examiner

METHODS FOR OBTAINING CONTENT FROM A PEER DEVICE

CROSS-REFERENCE TO RELATED APPLICATIONS

The present application claims priority to U.S. Provisional Patent Application No. 61/972,308, filed Mar. 29, 2014, the contents of which are incorporated herein by reference.

TECHNICAL FIELD

The present disclosure relates generally to peer-to-peer networking and, more particularly, to methods for obtaining content from a peer device.

BACKGROUND

When the Internet broke out of its roots in academia and became popular among consumers, the primary model of interaction between devices was server-client, in which information is concentrated in a centralized source (the server) and generally maintained by a single entity. Today, peer-to-peer ("P2P") interaction exceeds client-server interaction in terms of the overall volume of broadband Internet traffic. In a P2P network, each device becomes a source of information for all other devices on the network. Thus, when an owner of a device on a P2P network changes (e.g., deletes files or add files) the information that the device shares, the owner effectively changes the total shared repository of information on the P2P network. Consequently, information available on P2P networks tends to be dynamic in nature.

When peers in a P2P network "browse" one another's content, they gather and store metadata regarding the files stored in their respective repositories. Thus, even if device A and device B are not currently connected, device A may have a list of all of the files that are stored on, and shared by, device B by virtue of the fact that device A may have previously collected the relevant metadata from device B.

One possible topology for a P2P network is a mesh topology, in which each peer device relays data for the network, and all peers cooperate in the distribution of data in the network. One type of mesh network that can be used in the P2P context is a wireless mesh network, in which a number of wireless devices, such as mobile phones, interact with one another as peers in a mesh topology.

DRAWINGS

While the appended claims set forth the features of the present techniques with particularity, these techniques may be best understood from the following detailed description taken in conjunction with the accompanying drawings of which:

DESCRIPTION

An embodiment of the disclosure involves a method on a first peer device—an electronic device such as a cell phone (e.g., smartphone), a computer, a wearable electronic device (e.g., smart watch)—for obtaining content from a second peer device. Initially, the first peer device does not necessarily know that the second peer device has the content, and may not even know of the existence of the second peer device. The first peer device connects to a first mesh network, which does not include the second peer device. The first peer device transmits a request for the content to one or more other peer devices on the first mesh network. The request propagates through the first mesh network. The other peer devices do not necessarily have the requested content, but at least one of them—a third peer device—knows of the second peer device and knows that the second peer device has the requested content. The third peer device creates a tracker, which acts as a flag or "reminder" to the third peer device to pass the first peer device's request for the content along to the second peer device the next time the third peer device connects with the second peer device. In response to the request, the first peer device receives, from the third peer device, the identity of the second peer device and the identity of the file.

Subsequently, the third peer device connects to the second peer device over another mesh network (to which the first peer device may not be connected) and indicates to the second peer device that the first peer device has requested the file. Then, when the first peer device connects to the second peer device over another mesh network, the first peer device and the second peer device can carry out the content transfer with no further prompting. The next time that the first peer device encounters the peer devices to which it originally transmitted the request for the file (e.g., the third peer device), the first peer device can notify those peer devices that it has already obtained the requested content. When those other peer devices receive this notification, they (e.g., the third peer device) can then delete whatever trackers they previously created in response to the first peer device's original request.

Figure 1:
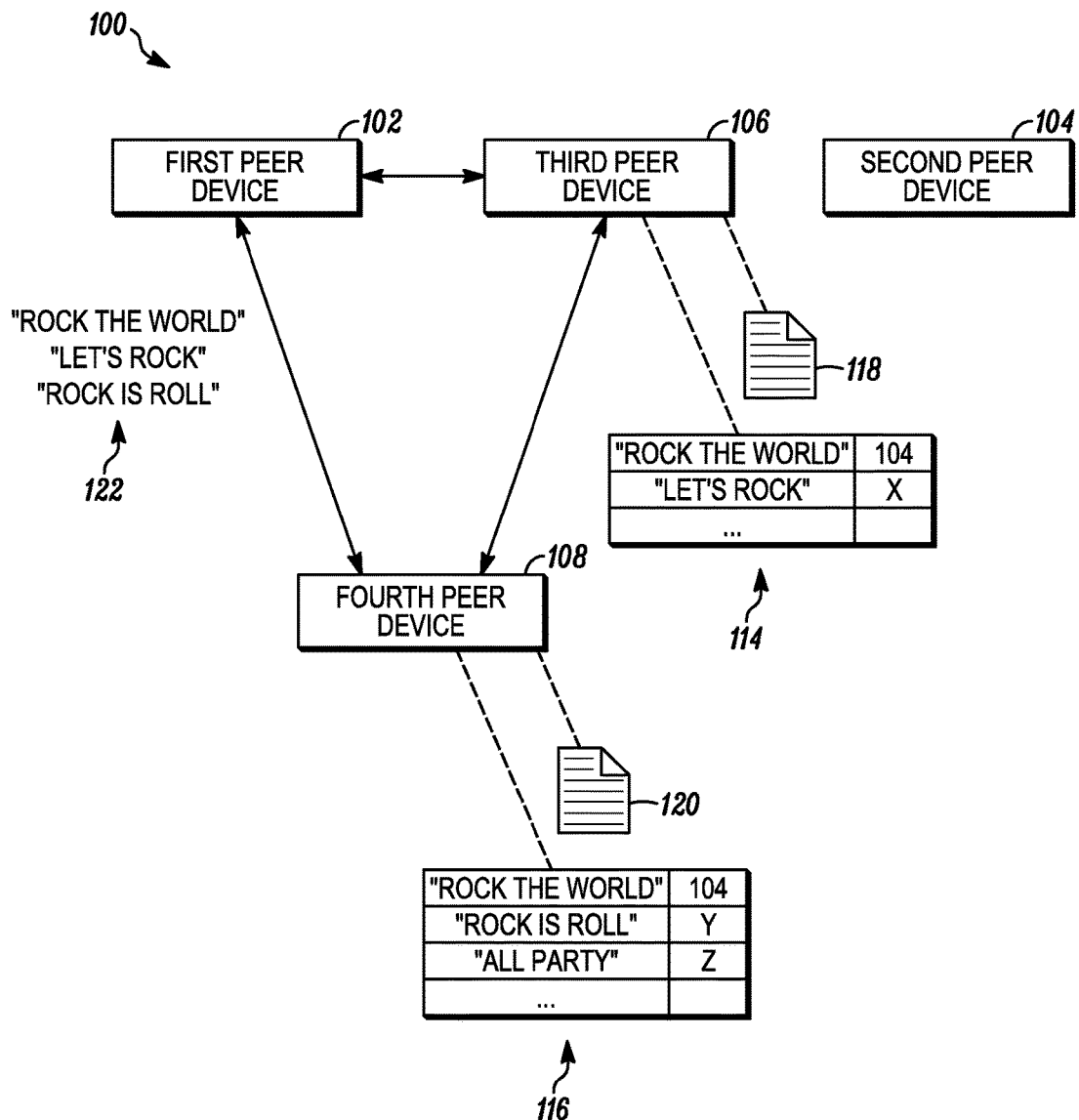
FIG. 1 is a block diagram of a mesh network according to an embodiment.

Turning to FIG. 1, a mesh network 100 in an embodiment of the disclosure includes a first peer device 102, a third peer device 106, and a fourth peer device 108. FIG. 1 also depicts a second peer device 104, which is not part of the mesh network 100. The mesh network 100, like all of mesh networks described herein, may be wired or wireless. The third peer device 106 has a data structure 114 (e.g., a mesh table). The data structure 114 lists content that belongs to (e.g., is stored on) other peer devices and that is known to the third peer device 106. The data structure 114 obtains its information from metadata that the third peer device 106 has received from other peer devices during its previous interactions with them. Each entry of the data structure 114 includes an identifier of an item of content (e.g., its filename, object identifier ("ID"), media ID, or title) and an identifier of the device on which the content is stored (e.g., the device ID). In one embodiment, the identifier of the content is the identity of the media in the device. In other words, the identifier of the content may be unique to the device itself. Thus, each entry of the data structure 114 may, in fact, be a single value that maps to the content and to the device on which the content is stored. In another embodiment, the identifier of the content is a hash of the content. The fourth peer device 108 also has a data structure 116 whose functionality is similar to that of the third peer device 106.

The content stored in the various devices of the mesh network 100 may be any type of content, but the entries of the data structures 114 and 116 are, for the sake of example, depicted in FIG. 1 as songs. Thus, the second peer device 104 has the song "Rock the World" stored in its memory, while the songs "Let's Rock," "Rock is Roll," and "All Party" are stored in devices X, Y, and Z (not depicted in FIG. 1), respectively. The third and fourth peer devices 106 and 108 have metadata (stored in their respective memories) regarding the contents of the second peer device 104 because, prior to connecting to the mesh network 100, these two devices had obtained such metadata from the second peer device 104 (e.g., obtained a list of files stored on and shared by the second peer device 104).

Figure 2:
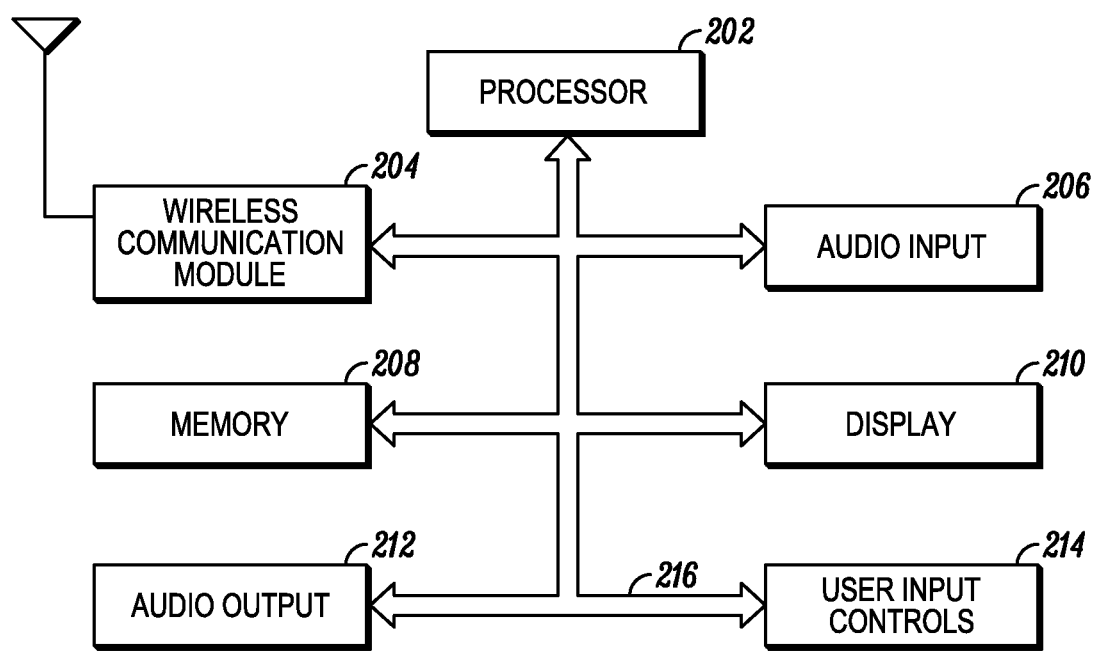
FIG. 2 is a block diagram of an peer device according to an embodiment.

The peer devices of FIG. may be implemented in a variety of ways. Turning to FIG. 2, an embodiment of a peer device includes a processor 202 (e.g., an applications processor, a controller, or a signal processor), a wireless communication module 204 (e.g., a communication chip such as a WiFi chip, or a communication chipset, such as baseband chipset or Bluetooth® chipset), an audio input 206 (e.g., a microphone), a memory 208 (which can be implemented as volatile memory or non-volatile memory), a display 210 (e.g. an organic light-emitting diode display), an audio output 212 (e.g., a speaker), and user input controls 214 (e.g., touch sensor controls on the display 210, user interface on the display 210, and physical buttons on the device). The peer device uses the wireless communication module 204 to engage in P2P networking over wireless mesh networks.

The processor 202 retrieves instructions and data from the memory 208 and, using the instructions and data, carries out the methods described herein. The processor 202 provides outgoing data to, or receives incoming data from the wireless communication module 204. Each of the elements of FIG. 2 is communicatively linked to one or more other elements via one or more data pathways 216. Possible implementations of the data pathways 216 include wires and conductive pathways on a microchip.

The term "peer device" as used herein may refer to a variety of different types of electronic devices, including cell phones (e.g., smartphones), computers, and various types of wearable devices (e.g., smart watches) with wired communication capability, wireless communication capability, or both wired and wireless communication capability. The term "content" as used herein refers to any digitally-stored information, including music, video, still photographs, and documents. Digital content is often stored in the form of one or more files.

Figure 3:
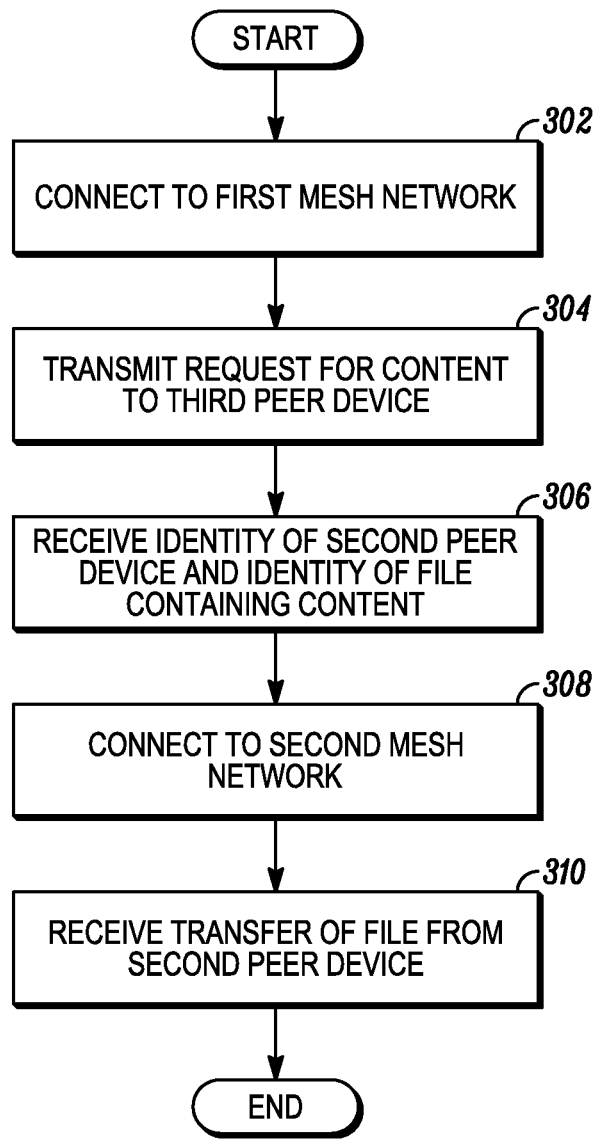
FIGS. 3 and 4 are process flow diagrams according to embodiments.
Figure 4:
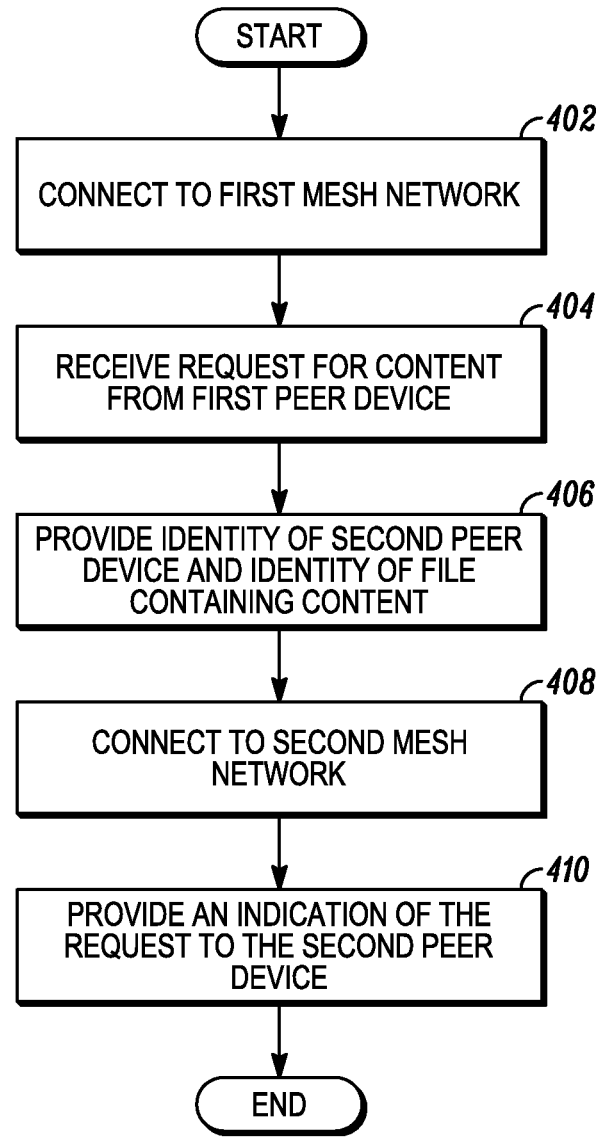

According to an embodiment, the first peer device 102 (FIG. 1) obtains content that is stored on the second peer device 104 by carrying out the process shown in the flow diagram of FIG. 3, and the third peer device 106 facilitates this process by carrying out the process shown in the flow diagram of FIG. 4. The second peer device 104 provides the content to the first peer device 102 by carrying out the process shown in the flow diagram of FIG. 7.

From the point of view of the first peer device 102 and the third peer device 106, the mesh network 100 is the "first mesh network." At block 302 (FIG. 3), the first peer device 102 (FIG. 1) connects to the mesh network 100. At block 402 (FIG. 4), the third peer device 106 connects to the mesh network 100. In this example, assume that a user of the first peer device 102 wishes to locate the song "Rock the World," but only remembers the fact that the title has the word "rock" in it. The user of the first peer device 102 inputs a search request (via the user input controls 214) using "rock" as the keyword. In response to the user input, the first peer device 102 transmits a search request with the key word "rock" to the rest of the peer devices of the mesh network 100. The third peer device 106 and the fourth peer device 108 each respond by searching their internal files and their respective data structures 114 and 116 for songs having "rock" in the title. The third peer device 106 and the fourth peer device 108 then transmit search results to the first peer device 102.

The first peer device 102 receives, from both the third peer device 106 and the fourth peer device 108, parts of a search result set 122, which includes "Rock the World," "Let's Rock," and "Rock is Roll." The user of the first peer device 102 selects (via the user input controls 214) the song "Rock the World." The first peer device 102 responds by transmitting a request for the content to the rest of the devices of the mesh network 100, including the third peer device 106, at block 304 (FIG. 3). The mesh network 100 propagates the first peer device 102's request to all of the devices in the mesh network 100. The third peer device 106 receives this request at block 404 (FIG. 4).

In this example, because none of the devices presently on the mesh network 100 actually possess the song "Rock the World," the first peer device 102 will not immediately be able to obtain the content. However, those devices having knowledge of where the content might be found may provide, to the first peer device 102, the identity of the device having the content as well as the identity of the file containing the content (e.g., the media ID of the content in the device). At block 406 (FIG. 4), the third peer device 106 provides the identity of the second peer device 104 (e.g., the second peer device's device ID) and the identity of the file on the second peer device 104 (e.g., the media ID of the content in the second peer device 104) containing the song "Rock the World" to the first peer device 102. At block 306 (FIG. 3), the first peer device 102 receives the identity of the second peer device 104 and the identity of the file on the second peer device 104 containing the song "Rock the World" from the third peer device 106.

In an embodiment, those devices receiving the request but unable to fulfill it create a tracker. The tracker serves to a reminder for that device to pass along the request to the possessor of the content once the device comes in contact with the possessor. In this example, the third peer device 106 creates a tracker 118 and the fourth peer device creates a tracker 120.

Figure 5:
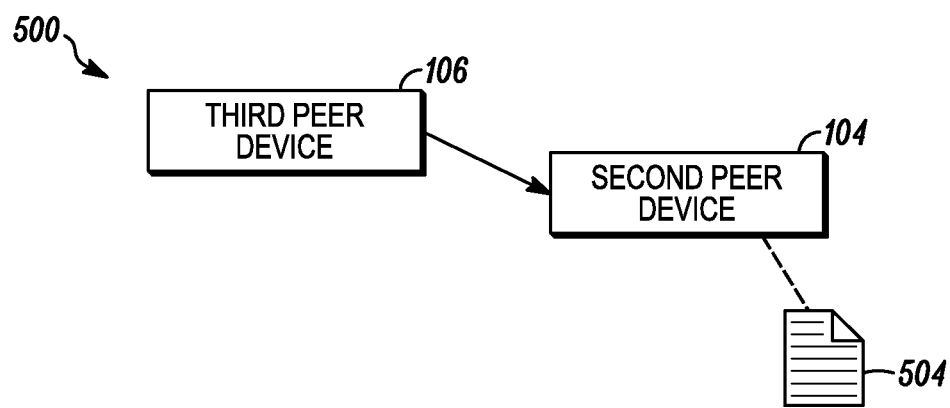
FIGS. 5 and 6 are block diagrams of mesh networks according to embodiments.

Continuing with the example, at block 408 of FIG. 4, the third peer device 106 connects to a mesh network 500 shown in FIG. 5. The second peer device 104 also connects to the mesh network 500 (block 702 of FIG. 7). From the point of view of the third peer device 106 the mesh network 500 is a second mesh network, while from the point of view of the second peer device 104 the mesh network 500 is a first mesh network. The mesh network 500 may include other peer devices, and may not include the first peer device 102 (of FIG. 1). At block 410 of FIG. 4, the third peer device 106 provides, to the second peer device 104, an indication of the first peer device 102's request. The second peer device 104 receives this indication at block 704 of FIG. 7. This indication (e.g., message) includes the identity (e.g., device ID) of the first peer device 102 and the identity of the file containing the content (e.g., the media ID of the content in the second device 104). The second peer device 104 reacts by creating a tracker 504, which will remind the second peer device 104 to provide the content to the first peer device 102 once the second peer device 104 connects with the first peer device 102.

Figure 6:
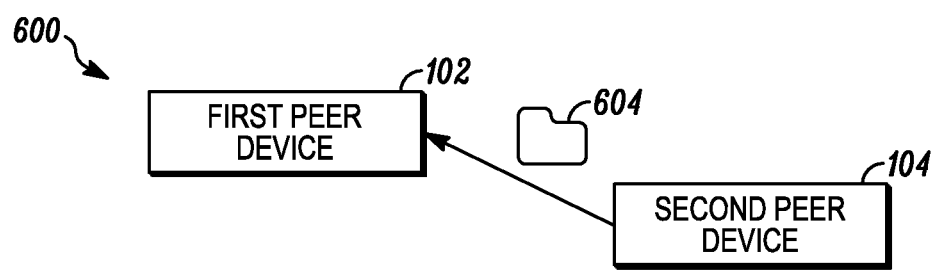
Figure 7:
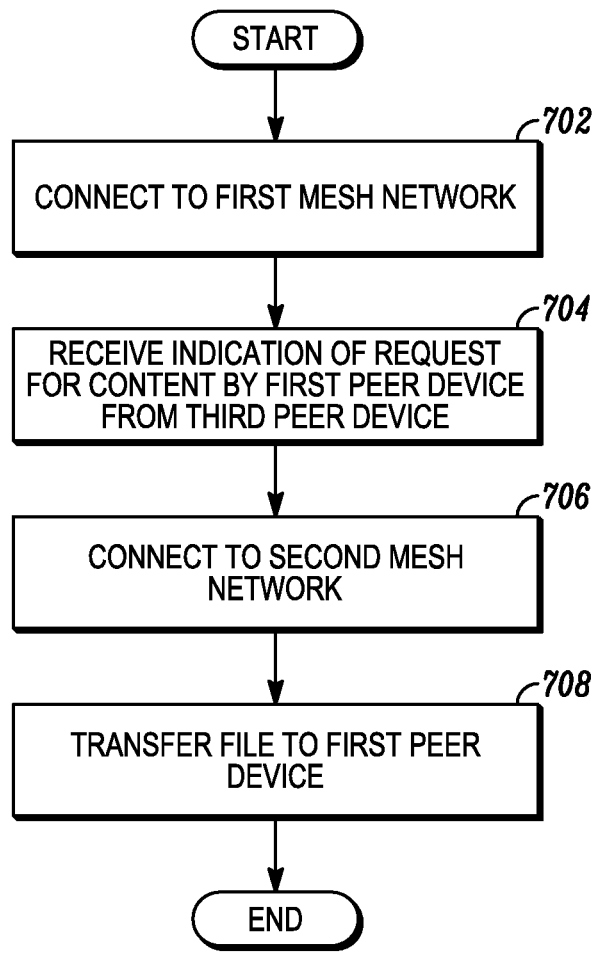
FIG. 7 is a process flow diagram according to an embodiment.

At block 308 of FIG. 3, the first peer device 102 connects to a mesh network 600 (FIG. 6), as does the second peer device 104 (block 706 of FIG. 7). The mesh network 600 may also include other devices. Because the first peer device 102 and the second peer device 104 are both aware of the outstanding request by the first peer device 102 for the content (the second peer device 104 being reminded of this by the existence of the tracker 504), the second peer device 104 may begin transferring a file 604 containing the song "Rock the World" to the first peer device 102 without any additional requests or prompting. For example, the second peer device 104 may transfer the file 604 to the first peer device 102 (block 708 of FIG. 7) immediately after the first peer device 102 and the second peer device 104 complete a peer-to-peer handshaking procedure. The first peer device 102 receives the file at block 310 of FIG. 3.

It is to be understood that any of the devices that received the request of the first peer device 102 on the mesh network 100 could have, upon establishing a connection with the second peer device 102, carried out the steps performed by the third peer device 106.

Figure 8:
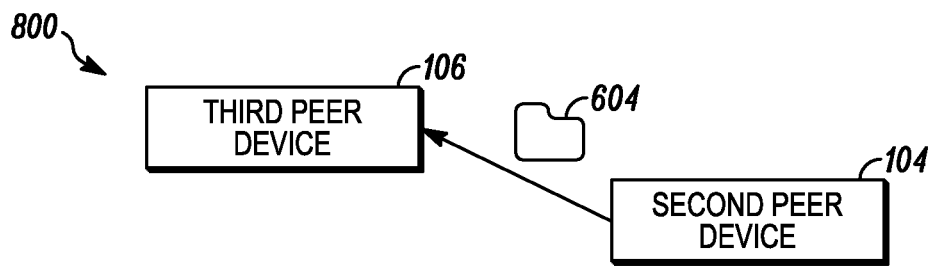
FIGS. 8 and 9 are block diagrams of mesh networks according to embodiments.
Figure 9:
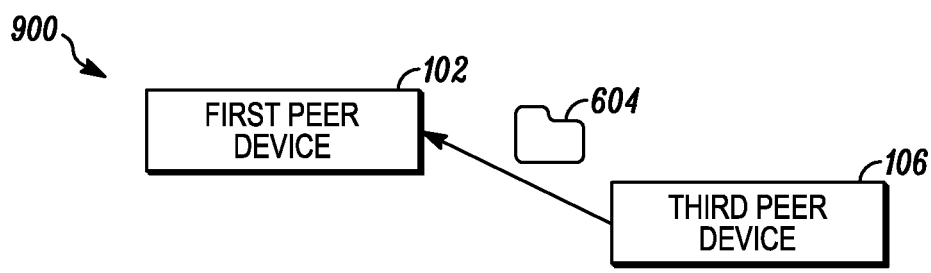

According to an embodiment, a peer device may, if the number of requests for a particular item of content meets a certain criterion (e.g., reaches a certain number), not only pass along a request for the item to other peer devices, but proceed to obtain the content itself. For example, if the first peer device 102's request for "Rock the World" is the fifth such request that the third peer device 106 of FIG. 1 has received for that song (from one or multiple devices) in the past 24 hours, then the third peer device 106 may, upon connecting with the first peer device 102, obtain a copy of the file containing the song. Referring to FIG. 8, for example, the third peer device 106 is shown as having connected to the second peer device 104 on a mesh network 800. At that point, based on being reminded by the tracker 118 (FIG. 1), and based on the number of requests for the song having met a certain criterion, the third peer device 106 requests and receives the file 604 from the second peer device 104. Thus, if the third peer device 106 reconnects to the first peer device 102 prior to the first peer device 102 having the chance to obtain the file directly from the second peer device 104, the third peer device 106 could provide the file to the first peer device 102. An example of this is shown in FIG. 9, in which the first and third peer devices connect over a mesh network 900, and the third peer device 106 transfers the file 604 containing "Rock the World" to the first peer device 102 after having received the file from the second peer device 102 in FIG. 8.

According to an embodiment, a peer device may prioritize the download of content based on the number of requests it has received for the content. For example, if the third peer device 106 (FIG. 1) has received fifty requests for the song "Rock the World" and twenty requests for some other song that the second peer device 104 possesses, then the third peer device 106 will, upon connecting with the second peer device 104 (FIG. 8) download "Rock the World" first.

According to an embodiment, once the first peer device 102 of FIG. 3 has succeeded in obtaining content that it had previously requested, it may notify the other devices from which it previously requested the content of this fact. For example, assume that the first peer device 102 has received the "Rock the World" song in the form of the file 604 (FIG. 6) and that the first peer device 102 re-joins the mesh network 100 or reconnects with one or more of the devices of the mesh network 100 over some other mesh network. The first peer device 102 may then notify the third peer device 106 and the fourth peer device 108 that it has received the file 604. The third peer device 106 may, in response to the notification, delete the tracker 118. Similarly, the fourth peer device 108 may respond by deleting the tracker 120.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method, on a first peer device, for obtaining content stored on a second peer device, the method comprising:
    connecting to a first mesh network that does not include the second peer device;
    transmitting a request for the content to a third peer device via the first mesh network;
    in response to the request, receiving, from the third peer device, the identity of the second peer device and the identity of a file containing the content;
    connecting to a second mesh network that includes the second peer device; and
    receiving a transfer of the file from the second peer device via the second mesh network.

2. The method of claim 1, further comprising:
    transmitting the request to a plurality of devices on the first mesh network, including the third peer device.

3. The method of claim 1, further comprising:
    transmitting a search request to the first mesh network;
    receiving a list of files from the third peer device in response to the search request, wherein the list includes the file containing the content.

4. The method of claim 1, further comprising:
    notifying the third peer device that the file has been received.

5. The method of claim 1, further comprising:
    notifying a plurality of devices to which the request was sent, including the third peer device, that the file has been received.

6. A method for facilitating the transfer of content to a first peer device from a second peer device, the method comprising:
    on a third peer device,
        connecting to a first mesh network that does not include the second peer device;
        receiving a request for the content from the first peer device;
        in response to the request, providing the identity of the second peer device and the identity of a file containing the content to the first peer device;
        connecting to a second mesh network that does not include the first peer device;
        providing an indication of the request to the second peer device, wherein the indication of the request includes the identity of the first peer device and the identity of the file.

7. The method of claim 6, further comprising:
    receiving a search request from the first peer device;
    in response to the search request, providing a list of files to the first peer device, wherein the list includes the file containing the content.

8. The method of claim 6, further comprising:
    prior to connecting to the first mesh network, obtaining, from the second peer device, a list of files stored on the second peer device.

9. The method of claim 6, further comprising:
receiving at least one additional request for the content;
if the number of requests for the content received meets a criterion, then obtaining the file from the second peer device.

10. The method of claim 6, further comprising:
receiving at least one additional request for the content;
if the number of requests for the content received meets a criterion, then prioritizing the downloading of the content from the second peer device.

11. The method of claim 6, further comprising:
creating a tracker representing the request;
receiving notification that the first peer device has received the file;
in response to the notification, deleting the tracker.

12. A method, on a second peer device, for providing content to a first peer device, the method comprising:
connecting to a first mesh network that does not include the first peer device;
receiving, from a third peer device, an indication of a request for the content, wherein the indication of the request includes the identity of the first peer device and the identity of a file containing the content;
connecting to a second mesh network that includes the first peer device; and
transferring the file to the first peer device.

13. The method of claim 12, further comprising:
providing, to the third peer device, a list of files stored on the second peer device.

\* \* \* \* \*